United States Patent Office 3,459,053
Patented Aug. 5, 1969

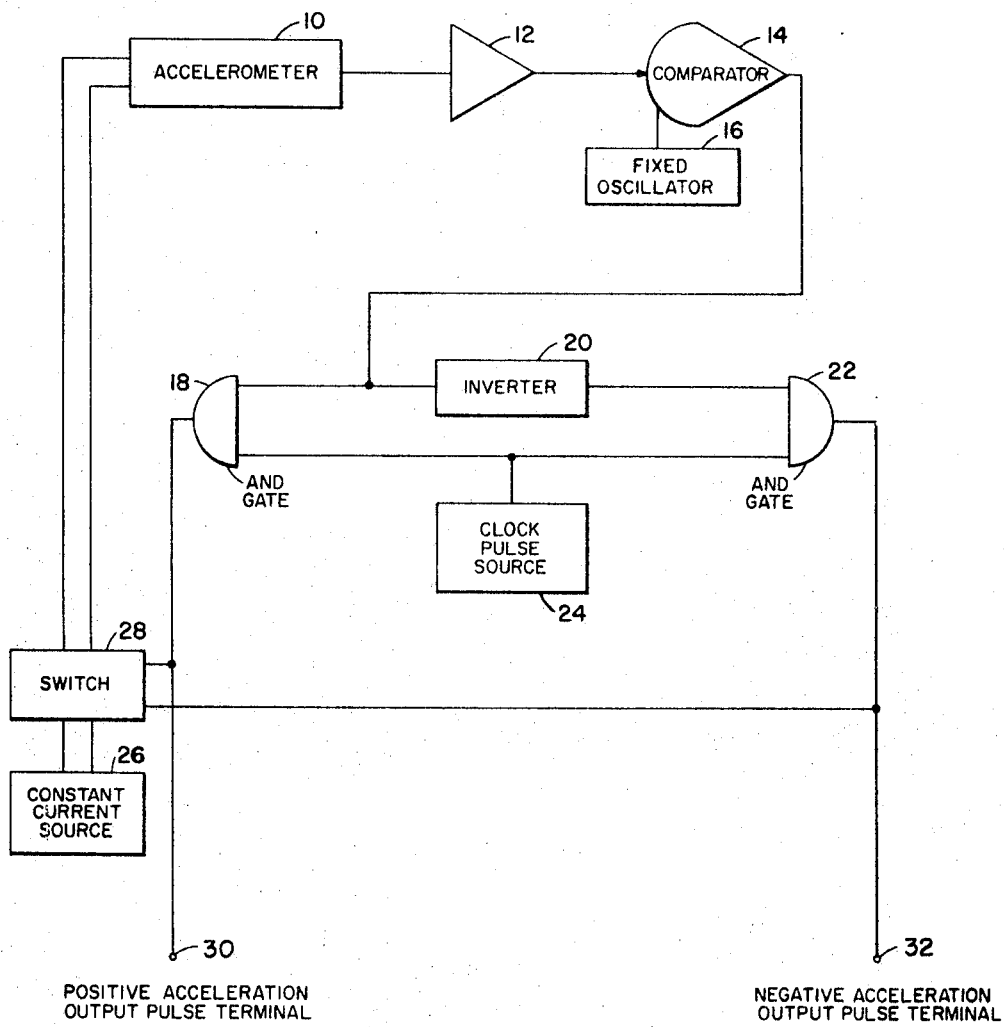

3,459,053
ANALOG ACCELEROMETER HAVING A DIGITAL OUTPUT SIGNAL
Brooks H. Grimme and Herbert R. McCarley, Huntsville, Ala., assignors to the United States of America as represented by the Secretary of the Army
Filed June 2, 1966, Ser. No. 554,895
Int. Cl. G01p *15/08*
U.S. Cl. 73—517      2 Claims

ABSTRACT OF THE DISCLOSURE

A device for causing a constant rebalance force, the polarity of which is dependent on the direction of acceleration, to be applied to an accelerometer. The D-C voltage output of an accelerometer indicative of acceleration is converted to a square wave and used to key AND gates so that they allow clock pulses to pass therethru and cause a constant current of a particular polarity to be switched into the accelerometer rebalance network.

---

The present invention relates to a digital conversion system that can be used on any existing accelerometer that utilizes an amplifier or amplifiers to generate positive or negative forces which tend to rebalance a signal generating device in response to external positive and negative accelerations.

Missile systems require extremely accurate measurements of acceleration. These measurements have been accomplished in the past with expensive analog accelerometers and expensive analog computers.

It has long been known that if digital acceleration signals could be generated then computer costs and errors could be greatly reduced.

Basically, there have been two ways that digital acceleration signals could be generated. First of the above methods is to employ an accelerometer that generates a digital signal direct. While this is a highly desirable solution at present, there is no known pure digital accelerometer with sufficient accuracy for use with an inexpensive digital computer. Some pure digital accelerometers with large non-linear errors are in use with expensive computers which make computer corrections for the non-linear errors.

The second method of generating a digital acceleration signal is to convert the output of an analog accelerometer to a digital signal. This method has not been successful in the past, because it has not been possible to produce digital pulses of sufficient accuracy. Even if the required accuracy could be achieved, the expense of the precision pulse circuits would be prohibitive.

It is, therefore, an object of this invention to provide a system for converting an analog accelerometer signal to a digital signal.

It is another object of this invention to provide an analog accelerometer having an improved accuracy when operated with a digital output signal generator.

It is a further object of this invention to provide an improved analog accelerometer system wherein the total cost of the accelerometer computer package is less than that of prior art systems.

In general, this invention contemplates causing the acceleration rebalance forces inside an accelerometer to occur at a constant level, but alternating at a fixed cyclic rate between positive and negative directions and switching directions once within each cycle only at discrete points of time corresponding to the exact occurrence of clock or timing pulses. This operation eliminates errors in the system due to pulse area mismatch (i.e., shifts in the leading and trailing edges of the pulses) by making the number of positive shifts equal to the number of negative shifts for any given input acceleration, thereby making the total number of positive and negative shifts remain constant for any given input. This means that the mismatch error appears as a bias that can be easily compensated.

Other objects and advantages of this invention will become more fully apparent from the following detailed description and from the accompanying drawings wherein the single figure is a block diagram illustrating one preferred embodiment of the present invention.

Referring now to the drawing, reference numeral 10 denotes a conventional analog force-balance accelerometer for sensing acceleration in a matter well known within the art and provides a positive, or negative D-C voltage, depending on the direction of accelerations sensed. The level of the D-C voltage depends on the amount of acceleration. The D-C voltage output of accelerometer 10 is connected through amplifier 12 to a pulse width modulating circuit consisting of a voltage comparator 14 and a fixed oscillator 16. The pulse width modulated output of comparator 14 is connected to an input of an AND gate 18 and also to a polarity inverter 20 which is connected to an input of a second AND gate 22. Each AND gate has a second input connected to a clock pulse source 24.

To provide a constant level rebalancing force to accelerometer 10, the constant current source 26 is connected thereto through a switch 28.

In the operation of the invention, the positive or negative signals from accelerometer 10 are amplified in amplifier 12 and fed to voltage comparator 14 where they are compared with a fixed frequency signal from oscillator 16. The output from the fixed oscillator is preferably in the form of a triangular wave, and the comparator has an output that is an approximate square wave which reverses its polarity when the combined inputs switch polarity.

The comparator produces a pulse whenever its combined inputs exceed a predetermined positive or negative level. The width of the pulse is determined by the length of time the combined inputs to the comparator exceed the predetermined positive and negative response levels for the comparator. The D-C voltage from amplifier 12 simply shifts the reference level of the output of fixed oscillator 16 and thus the time when the peaks of the triangular wave output from fixed oscillator 16 exceeds the levels necessary to cause comparator 14 to saturate. The range of the voltage outputs from accelerometer 10 and fixed oscillator 16 are chosen with the saturation levels of comparator 14 in mind. This prevents the combined inputs to comparator 14 from causing comparator 14 to operate entirely in a saturated zone for any expected acceleration. The maximum and minimum voltage levels produced by accelerometer 10 and fixed oscillator 16 must be such that the output from comparator 14 changes once during each cycle of the triangular wave output from fixed oscillator 16.

As long as the output from the voltage comparator is positive, pulses from the clock pulse source 24 are permitted to pass through gate 18 to positive acceleration output pulse terminal 30, and when the output is negative, clock pulses are passed through gate 22 to the negative accelerometer output pulse terminal 32. The AND gate outputs are also connected to switch 28 which controls the directions of current flow from the constant current source into the torque coil of the accelerometer. A positive square wave output from comparator 14 applied to gate 18 together with a pulse from clock pulse source 24 will cause switch 28 to connect constant current source 26 to accelerometer 10 with a polarity necessary to rebalance the accelerometer for a positive acceleration. Inverter 20 prevents the positive square wave output from comparator 14 from reaching gate 22. When acceleration is negative, the negative square wave output from comparator 14 will be inverted by inverter 20 and cause gate 22 to conduct when gate 22 receives a pulse from clock pulse source 24. The output of gate 22 will cause switch 28 to connect constant current source 28 to accelerometer 10 with a polarity necessary to rebalance the accelerometer for a negative acceleration. Switch 28 remains in a particular "made" position until it receives an input which causes it to switch.

It is seemed, therefore, that the above described system provides positive and negative acceleration signals in digital form and also provides a constant level rebalancing current that is allowed to reverse direction only at discrete points of time corresponding to clock pulses.

While this invention has been described with reference to a specific embodiment thereof, it will be apparent that various modifications and changes may be made without departing from the spirit of the invention as defined in the appended claims.

We claim:
1. An analog accelerometer having a digital output comprising: an accelerometer providing a D-C analog acceleration signal; pulse width modulating means responsive to said analog signal providing a square wave signal having a width and polarity directly relating to the magnitude and polarity of said analog signal; a first AND gate having a first input terminal connected to the output of said pulse width modulating means; a clock pulse source producing a continuous equally spaced pulse train having its output connected to a second input of said first AND gate; a first output terminal connected to the output of said first AND gate; a polarity inverter having an input terminal connected to the output of said pulse width modulating means; a second AND gate having a first input connected to the output of said polarity inverter and a second input connected to the output of said clock pulse source; a second output terminal connected to the output of said second AND gate; a means for providing a rebalance force to said accelerometer comprising a constant current source and a switching means, said switching means connected directly to and responsive to the output of said first and second gates; said constant current source connected directly to said switching means; said switching means connected directly to said accelerometer, said switching means reversing the polarity of the output of said constant current source and applying said current to said accelerometer as a rebalancing force, said switching means reversing said current polarity only at the time a clock pulse starts passing through said gates.

2. An analog accelerometer having a digital output as set forth in claim 1 wherein said pulse width modulating means comprises a voltage comparator having a first input connected to the output of said accelerometer and a fixed oscillator having its output connected to a second input of said voltage comparator.

References Cited
UNITED STATES PATENTS

| | | | |
|---|---|---|---|
| 2,943,493 | 7/1960 | Ten Bosch et al. | ___73—516 XR |
| 3,028,550 | 4/1962 | Naydan et al. | |
| 2,702,186 | 2/1955 | Head et al. | _____ 73—517 |

JAMES L. GILL, Primary Examiner